Nov. 14, 1939.　　　L. M. LEWISON　　　2,179,793
RIDGE LEVELING ATTACHMENT FOR TRACTOR CULTIVATORS
Filed April 27, 1937　　　2 Sheets-Sheet 1
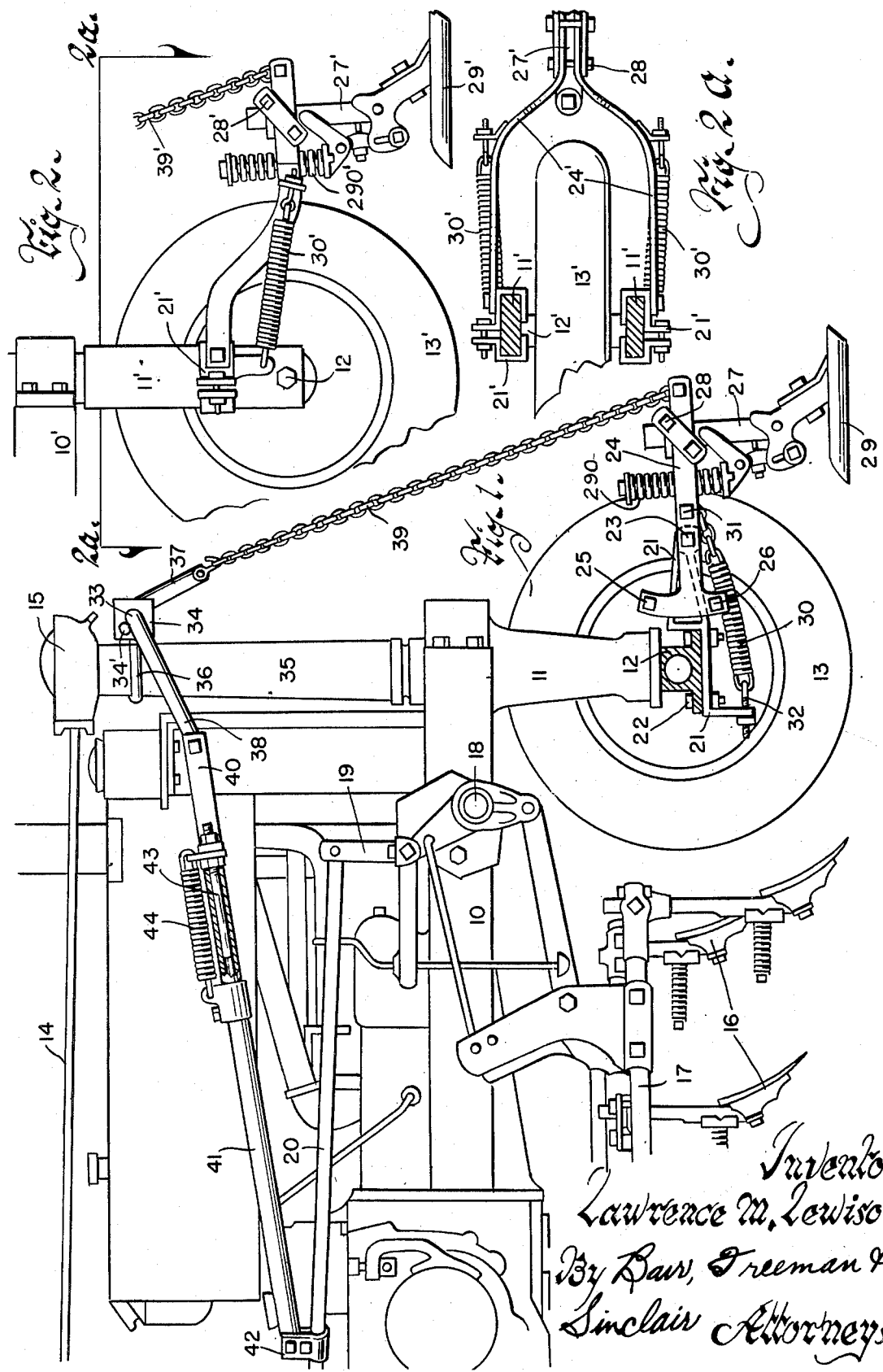
Inventor
Lawrence M. Lewison
By Barr, Freeman &
Sinclair Attorneys Nov. 14, 1939.  L. M. LEWISON  2,179,793
RIDGE LEVELING ATTACHMENT FOR TRACTOR CULTIVATORS
Filed April 27, 1937  2 Sheets-Sheet 2
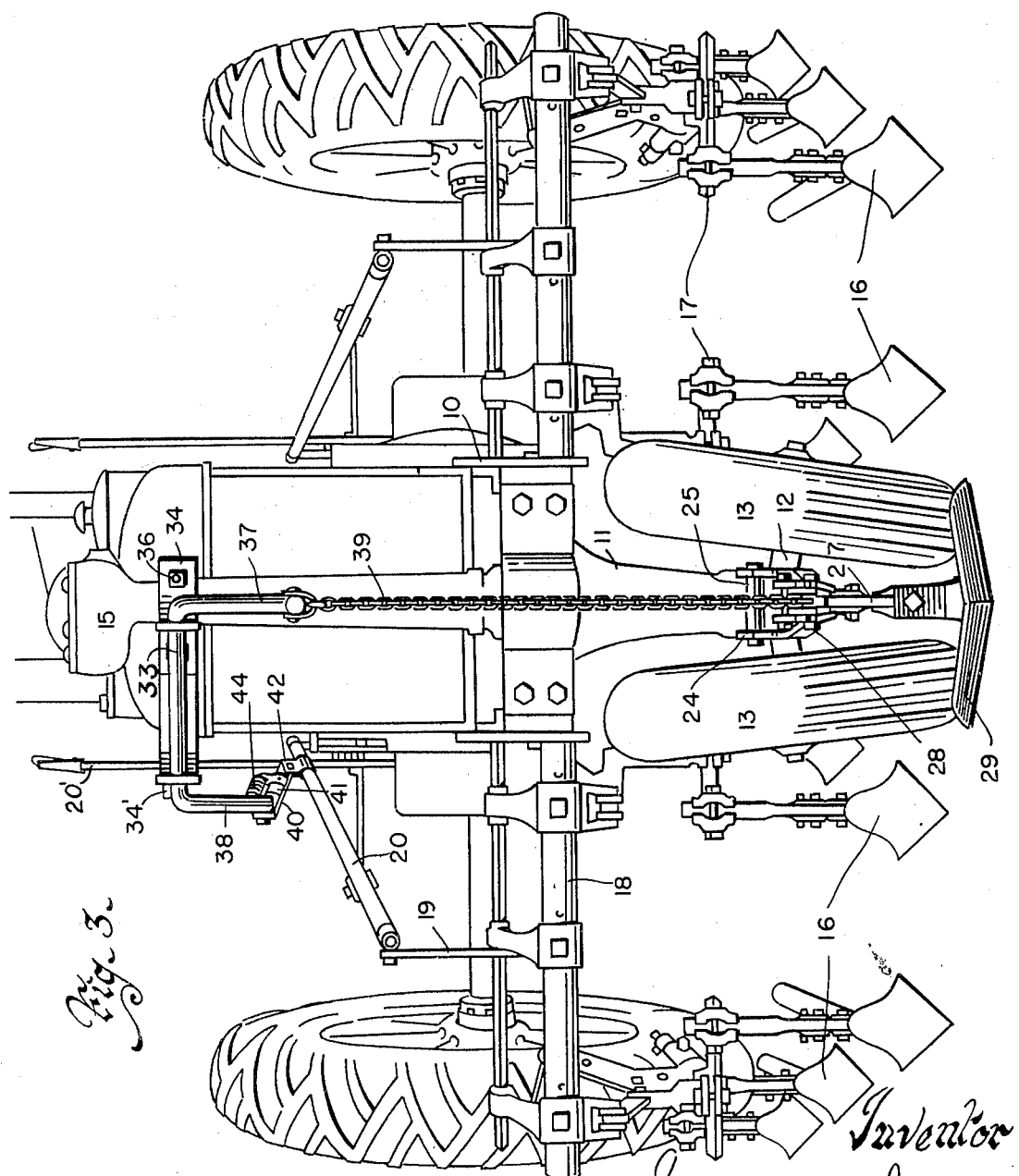

Patented Nov. 14, 1939

2,179,793

UNITED STATES PATENT OFFICE 2,179,793

RIDGE LEVELING ATTACHMENT FOR TRACTOR CULTIVATORS

Lawrence M. Lewison, Sioux Rapids, Iowa

Application April 27, 1937, Serial No. 139,216

2 Claims. (Cl. 97—47)

One object of my present invention is to provide an attachment for tractor cultivators which includes mechanism of simple, durable and inexpensive construction for leveling ridges in the ground of a corn field or the like when cross cultivating the field, and for raising the leveling blade to a non-ridge leveling position at desired times.

A further object is to provide a construction of this character particularly adapted for the Farmall type of tractors, and mounted on the tractor itself as distinguished from being mounted on the cultivating device, as shown in my former Patent No. 1,907,842, of May 9, 1933.

More particularly it is my object to provide a ridge leveling device including a bracket adapted for attachment to the front of the tractor and a supporting arm pivoted thereto having a ridge leveling blade carried by its forward end in advance of the front wheel or wheels of the tractor for leveling the cross ridges during cross cultivation, and thereby provide a smoother operation of the tractor and its cultivating devices instead of the usual jumpy operation experienced when these cross ridges are not so leveled.

With these and other objects in view, my invention consists in the construction, arrangement and combination of the various parts of my ridge leveling attachment for tractor cultivators, whereby the objects contemplated are attained, as hereinafter more fully set forth, pointed out in my claims, and illustrated in the accompanying drawings, in which:

Figure 1 is a side elevation of a ridge leveling attachment embodying my invention, and illustrating it connected with a tractor cultivator.

Figure 2 is a side elevation of a portion thereof showing a slightly modified construction for attachment to the fork of a tractor having a single wheel instead of attachment between a pair of wheels, as shown in Figures 1 and 3.

Figure 2a is a sectional view on the line 2a—2a of Figure 2; and

Figure 3 is a front perspective view of the attachment and tractor cultivator shown in Figure 1.

In raising some crops, such as corn, it is customary to plant the corn in such manner that the stalks are arranged in rows, not only lengthwise but also crosswise of the field. In this manner it is possible when cultivating the crop, to cultivate the first time in one direction and the next time at right angles thereto. The second cultivating operation is termed "cross cultivation".

The travel of the tractor cultivator during the second operation across the alternate ridges and trenches formed by the previous cultivating operation results in an undesirable jolting of the front end of the tractor, and raising and lowering of the cultivating devices, as well as making it necessary to travel at a slower rate of speed. This is very uncomfortable for the operator and also imposes a considerable strain on the tractor and cultivating devices.

For the purpose of relieving this discomfort and strain, the present invention contemplates the use of a ground leveling blade arranged to travel in advance of the forward wheel or wheels of the tractor for leveling the ridges in line with the travel of the front wheel or wheels, the attachment being adapted for mounting on the Farmall type of tractors having a front wheel or pair of wheels set close together, and rear widely spaced traction wheels. The attachment is adapted to be moved into and out of ridge leveling position by and through the same mechanism which is employed to raise and lower the cultivating devices of the cultivator tractor.

The tractor in general includes a frame 10 having a steering column 11 at its forward end and a front axle 12 mounted thereon. The front wheels 13 of the tractor are mounted for free rotation relative to the axle 12 and may be turned for steering operation by rotating the usual steering shaft journaled in the steering column 11. A steering shaft 14 is usually provided for this purpose which extends rearwardly to the usual steering wheel (not shown), the housing 15 being provided for suitable gearing which transmits the rotation of the shaft 14 to the column 11.

The cultivating devices include the cultivator shovels 16 carried by a suitable frame work 17 pivotally mounted on a rock shaft 18. The shaft 18 may be rocked by an arm 19 and a rod 20 which extends rearwardly to the usual operating lever 20' for this purpose. By rocking the shaft 18, the cultivator shovels 16 may be raised from cultivating position if desired.

My present ridge leveling attachment includes a bracket 21 adapted to be secured to the front axle 12 or some other part of the column 11 by bolts or the like 22. The bracket 21 carries a pivot bolt 23 on which is pivoted a supporting arm 24. This arm is limited in its pivotal movement relative to the bracket 21 by stop bolts 25 and 26 engageable at the limits of movement of the arm 24 with the top and bottom respectively of the bracket 21.

The forward end of the supporting arm 24 carries a vertical shank 27 secured to the arm 24 as by clamp bolts 28. A ridge leveling blade 29 is mounted on the shank 27 in advance of the wheels 13 of the tractor. This blade is normally retained in lowered position by a spring 30 which has one end secured to a bolt 31 ahead of the pivot bolt 23, and its other end adjustably secured by a bolt 32 to the bracket 21.

For raising the supporting arm 24 and thereby the leveling blade 29 to a non-ridge leveling position, I provide a rock shaft 33 pivotally carried by a bracket 34. The bracket 34 is adapted to be secured to a supporting sleeve 35 for the steering column 11 by a U-bolt 36.

The rock shaft 33 has a pair of arms 37 and 38. The arm 37 is connected by a flexible connection, such as a chain 39, to the forward end of the supporting arm 24. The arm 38 is connected by a link 40 and a tubular rod 41 to the cultivator shovel raising rod 20. A clamp 42 serves as the connecting means between the rods 20 and 41.

The link 40 has a rod-like extension 43 secured thereto and telescopically mounted in the forward end of the tubular rod 41. The rear end of the link 40 is normally retained in engagement with the forward end of the rod 41 by a spring 44.

In Figures 2 and 2a I show a modified construction for the type of tractor having a fork 11' which is oscillatable for steering purposes instead of a steering column 11. The frame of the tractor is indicated at 10'. The fork journals a single wheel 13' and a pair of clamp brackets 21' are secured to the tines of the fork, as shown in Figure 2a. The supporting arm 24' is forked and a pair of pivot bolts 23 are provided therefor which are carried by the two brackets 21'. A spring connection 30' serves normally to retain the leveling blade 29' in lowered position and the chain 29' taut.

This construction permits mounting of the leveling blade 29' in front of a single wheel carried by a fork as distinguished from a pair of wheels carried by a steering column.

*Practical operation*

In the operation of my invention, the leveling blade 29 normally assumes the position shown in Figure 1 during cultivating operations, that is, when the shovels 16 are lowered for cultivating the ground. The blade 29 being in advance of the wheels 13 or the wheel 13', levels the cross ridges so that the front wheel or wheels travel in a level line as distinguished from a wavy line due to the cross ridges.

The spring 30 primarily holds the blade 29 in the ground and will also permit the blade to rise over small obstructions, the flexible chain 39 permitting such rising of the blade without the motion thereof being transmitted to the rock shaft 33. When large obstructions such as rocks or stumps or sodded dead furrows (occurring at the edges of the field when turning around) are encountered, however, a spring trip 290, similar to those used on cultivators, trips to position, permitting the blade to swing backwardly and pass thereover instead of breaking any parts, and after the obstruction is passed the spring trip returns the blade to normal position.

With the parts 40 and 41 in the position shown in Figure 1 relative to each other, the blade 29 assumes its proper lower limit of movement as determined by the length of the chain 39. Whenever the cultivator shovels 16 are adjusted to a deeper position in the ground, the spring 44 can stretch to permit such adjustment without further movement of the rock shaft 33 in a counter-clockwise direction, the shaft being limited, for instance, by a stop pin 34' engaging the arm 38.

Whenever the shovels 16 are raised from the ground, however, by forward motion of the rod 20, the rock shaft 33 will be swung in a counter-clockwise direction for thereby automatically lifting the leveling blade 29 to an inoperative position. This is particularly desirable when turning at the end of the row. Thus the blade is automatically moved to and from leveling position without any attention from the operator other than the necessary attention given to the cultivating and non-cultivating positions necessary for the shovels 16 during operation of the tractor cultivator.

My attachment may be readily mounted on either of the types of tractors shown in Figure 1 or 2, and will not interfere with the operation thereof but, on the other hand, will greatly increase the comfort and convenience to the operator because of eliminating the jolting occasioned by rather rapid traveling of the tractor over rough ground, particularly in the operation of cross cultivating, as previously set forth.

My ridge leveling attachment can be applied to any "row crop" tractor where suitable parts thereof are adaptable for attaching brackets such as the ones illustrated at 21 and 34. These brackets, of course, may be modified in shape and other changes may be made in the construction and arrangement of the parts of my device without departing from the real spirit and purpose of my invention, and it is my intention to cover by my claims, any modified forms of structure or use of mechanical equivalents which may be reasonably included within their scope.

I claim as my invention:

1. In a cultivator, a frame provided with a set of cultivator blades mounted thereon adapted to dig into the surface of the ground, a rock shaft having a pair of connections with said set of blades for positively raising and lowering the same, a manually actuated lever and a rod connecting said lever with said rock shaft, the combination of a ridge leveling attachment comprising a supporting member pivotally carried by the cultivator frame in advance of a front wheel thereon adapted to be raised and lowered, a ridge leveling blade on said supporting member adapted to contact the earth in advance of said wheel, a pair of pivoted crank arms, one of said crank arms being loosely connected to said supporting member for raising it only and adapted to release it for lowering to an operating position, the other of said arms having a rod connection with said manually actuated lever, a resilient joint in said rod connection to permit movement of said manually actuated lever in a direction to positively raise and lower the position of the cultivator blades with respect to the ground without changing the released position of said ridge leveling attachment.

2. In a cultivator having a frame and a front wheel thereon, a ridge leveling attachment comprising a supporting member pivoted to the frame in advance of the front wheel, a horizontal ridge leveling blade on said supporting member, resilient means connected between said supporting member and the frame adapted to draw said member and the ridge leveling blade into a horizontal operative position, a pair of integrally pivoted crank arms on the frame and a manually operated lever for changing the position of said arms, one of said arms having a connection adapted to lift only said supporting member and release it to operation of said resilient means, the other of said arms having a resilient connection with said manually operated lever cooperable with said first resilient means to balance said ridge leveling attachment in a horizontal position.

LAWRENCE M. LEWISON.